(12) United States Patent
Mays, Jr.

(10) Patent No.: US 7,082,267 B1
(45) Date of Patent: **\*Jul. 25, 2006**

(54) SHARED MULTI-CHANNEL PARALLEL OPTICAL INTERFACE

(75) Inventor: Robert Mays, Jr., Austin, TX (US)

(73) Assignee: R& DM Foundation, Austin, TX (US)

( * ) Notice: Subject to any disclaimer, the term of this patent is extended or adjusted under 35 U.S.C. 154(b) by 462 days.

This patent is subject to a terminal disclaimer.

(21) Appl. No.: 09/648,847

(22) Filed: Aug. 25, 2000

(51) Int. Cl.
*H04B 10/00* (2006.01)

(52) U.S. Cl. .................. 398/156; 398/131

(58) Field of Classification Search ........... 359/15–19; 398/141, 156, 130, 131
See application file for complete search history.

(56) References Cited

U.S. PATENT DOCUMENTS

| | | |
|---|---|---|
| 3,610,926 A | 10/1971 | Kastner et al. |
| 3,751,132 A | 8/1973 | Croh |
| 3,785,736 A | 1/1974 | Spitz et al. |
| 3,885,856 A | 5/1975 | Ostrowsky et al. |
| 4,057,319 A | 11/1977 | Ash et al. |
| 4,296,994 A | 10/1981 | Quick et al. |
| 4,359,259 A | 11/1982 | Horner et al. |
| 4,392,709 A | 7/1983 | Horner et al. |
| 4,510,575 A | 4/1985 | Mueller et al. |
| 4,655,539 A | 4/1987 | Caulfield et al. |
| 4,710,605 A | 12/1987 | Presby |
| 4,807,978 A | 2/1989 | Grinberg et al. |
| 4,817,207 A | 3/1989 | Smith et al. |
| 4,897,541 A | 1/1990 | Phillips |
| H738 H | 2/1990 | McManus et al. |
| 4,932,989 A | 6/1990 | Presby |
| 4,953,954 A | 9/1990 | Ewbank et al. |
| 4,991,150 A | 2/1991 | Wixom |
| 5,008,890 A | 4/1991 | McFarlane |
| 5,011,254 A | 4/1991 | Edwards et al. |
| 5,056,039 A | 10/1991 | Caulfield |
| 5,103,324 A | 4/1992 | Brandstetter |
| 5,132,813 A | 7/1992 | Caulfield et al. |
| 5,140,657 A | 8/1992 | Thylen |
| 5,245,623 A | 9/1993 | McFarlane |
| 5,256,851 A | 10/1993 | Presby |
| 5,295,208 A | 3/1994 | Caulfield et al. |
| 5,325,386 A | 6/1994 | Jewell et al. |
| 5,369,415 A | 11/1994 | Richard et al. |
| 5,399,315 A | 3/1995 | Paz-Pujalt et al. |
| 5,411,709 A | 5/1995 | Furuki et al. |

(Continued)

FOREIGN PATENT DOCUMENTS

WO    WO 99/59766    11/1999

(Continued)

OTHER PUBLICATIONS ("Optical Holography: Principles, Techniques and Applications", 2nd Edition by Hariharan, Cambridge University Press, pp. 213-223.*

(Continued)

*Primary Examiner*—M. R. Sedighian
*Assistant Examiner*—Shi K. Li
(74) *Attorney, Agent, or Firm*—Kenneth C. Brooks (57) ABSTRACT

An optical communication method and system that features concurrently refracting and filtering, employing a holographic transform function, optical energy to impinge upon an optical detector with unwanted characteristics of the optical energy being removed. To that end, the system includes a source of optical energy to direct optical energy along a path, an optical detector disposed in the path, and an optical apparatus. The optical apparatus includes a lens having an arcuate surface and a holographic transform function recorded throughout the volume of the lens.

20 Claims, 4 Drawing Sheets

U.S. PATENT DOCUMENTS

| | | | |
|---|---|---|---|
| 5,442,433 A | 8/1995 | Hoshino et al. | |
| 5,446,334 A | 8/1995 | Gaffney | |
| 5,446,572 A | 8/1995 | Husbands et al. | |
| 5,446,816 A | 8/1995 | Shiraishi et al. | |
| 5,467,104 A | 11/1995 | Furness, III et al. | |
| 5,515,194 A | 5/1996 | Kanterakis et al. | |
| 5,521,913 A | 5/1996 | Gridley | |
| 5,596,339 A | 1/1997 | Furness, III et al. | |
| 5,602,679 A | 2/1997 | Dolgoff et al. | |
| 5,622,868 A | 4/1997 | Clarke et al. | |
| 5,659,327 A | 8/1997 | Furness, III et al. | |
| 5,677,778 A | 10/1997 | Kanterakis et al. | |
| 5,699,464 A | 12/1997 | Marcuse et al. | |
| 5,706,114 A | 1/1998 | Erteza | |
| 5,772,720 A | 6/1998 | Taira-Griffin et al. | |
| 5,793,919 A | 8/1998 | Payne et al. | |
| 5,809,198 A | 9/1998 | Weber et al. | |
| 5,822,091 A | 10/1998 | Baker | |
| 5,832,147 A | 11/1998 | Yeh et al. | |
| 5,854,697 A | 12/1998 | Caulfield et al. | |
| 5,857,042 A * | 1/1999 | Robertson et al. | 385/33 |
| 5,886,822 A | 3/1999 | Spitzer | |
| 5,915,097 A | 6/1999 | Chao | |
| 5,930,012 A | 7/1999 | Mears et al. | |
| 5,935,288 A | 8/1999 | DiGiovanni et al. | |
| 5,943,149 A | 8/1999 | Cearns et al. | |
| 6,008,781 A | 12/1999 | Furness, III et al. | |
| 6,055,099 A | 4/2000 | Webb | |
| 6,072,579 A | 6/2000 | Funato | |
| 6,079,252 A | 6/2000 | Tabler et al. | |
| 6,081,430 A | 6/2000 | La Rue | |
| 6,083,767 A | 7/2000 | Tjaden et al. | |
| 6,144,472 A | 11/2000 | Knox | |
| 6,151,144 A | 11/2000 | Knox | |
| 6,185,215 B1 | 2/2001 | Aho | |
| 6,246,026 B1 | 6/2001 | Vergeest | |
| 6,246,680 B1 | 6/2001 | Muller et al. | |
| 6,284,546 B1 | 9/2001 | Bryning et al. | |
| 6,304,694 B1 * | 10/2001 | Ford | 385/33 |
| 6,314,210 B1 | 11/2001 | Fukushima et al. | |
| 6,449,066 B1 * | 9/2002 | Arns et al. | 359/15 |
| 6,452,700 B1 * | 9/2002 | Mays, Jr. | 359/15 |
| 6,486,984 B1 | 11/2002 | Baney et al. | |
| 6,542,264 B1 * | 4/2003 | Agranat et al. | 359/3 |
| 6,826,368 B1 | 11/2004 | Koren et al. | |
| 2002/0024702 A1 * | 2/2002 | Mays | 359/154 |
| 2002/0089709 A1 | 7/2002 | Mays, Jr. | |
| 2002/0167698 A1 * | 11/2002 | Mays | 359/154 |
| 2002/0191254 A1 | 12/2002 | Mays, Jr. | |
| 2002/0191598 A1 | 12/2002 | Mays, Jr. | |

FOREIGN PATENT DOCUMENTS

| | | |
|---|---|---|
| WO | WO 99/60192 | 11/1999 |
| WO | WO 00/02700 | 1/2000 |
| WO | WO 00/04660 | 1/2000 |
| WO | WO 00/05026 | 2/2000 |
| WO | WO 00/28359 | 5/2000 |
| WO | WO 00/32327 | 6/2000 |

OTHER PUBLICATIONS ("Optical Principles and Technology for Engineers" by J. Stewart, Marcel Dekker, 1996, pp. 45-51 and 79-81.*

"United States Frequency Allocations-1996," http://www.autoid.org/documents/freqallochrt.pdt.

Johnson, R. Barry and Caulfield, H. John; "Expert Report of R. Barry Johnson and H. John Caulfield on Technology Issues Related to Amaysing Technologies v. CyberAir Communications, et al."; In The Court of Chancery of the State of Delaware, in and for New Castle County; 121 pages (including exhibits); Apr. 29, 2005.

Wolffer, Vinouze, and Gravey; "Holographic Switching Between Single Mode Fibres Based on Electrically Addressed Nematic Liquid Crystal Gratings With High Deflection Accuracy"; Optics Communications; pp. 42-46; Feb. 1, 1999.

O'Shea, Donald et al.; "Diffractive optics can simulate the effects of many conventional optics while offering powerful optical performance in a lightweight, compact component"; OE Magazine; May 2001, Tutorial; 5 pages; Sep. 29, 2005.

Laser Focus World; "Optical interconnects aim for faster, smaller, cheaper, and lower power"; http://lfw.pennet.com/articles; 6 pages; Sep. 29, 2005.

* cited by examiner

SHARED MULTI-CHANNEL PARALLEL OPTICAL INTERFACE

BACKGROUND OF THE INVENTION

The present invention relates to an optical free space interconnect of circuitry. Particularly, the present invention concerns optical interconnection employed in computers.

One of the current approaches to increasing computational and control power is to link multiple low cost, distributed processors together. In this manner, the cost associated with a single processor capable of the similar computational efficiency may be avoided. Currently the distributed processing is achieved by employing high-speed data links using conventional wire and connector technology, referred to herein as "hardwired technology". Specifically, the high-speed data links facilitate data communication between processor nodes and other dedicated component-to-component and/or board-to-board applications as processor speeds increase. As processor speeds increase, however, the present data-links will result in data transfer bottlenecks, due to the limited data transfer rate the same may provide. Moreover, data link reliability may be compromised as the number of wires employed in the data link increases.

To improve the operational characteristics of the aforementioned data links, advancements in optical communication systems have been employed to replace the conventional the hardwired technology. A well-known example includes the replacement of conventional copper wires used for telephony with optical dielectric wave guides commonly know as optical fibers. This has generated a need for improvement methodologies to interconnect the optical fibers together or with other optical devices such as light sources, light detectors, and the like. To that end, the prior art is replete with improved techniques for interconnecting optical components.

U.S. Pat. No. 4,057,319 to Ash et al. discloses such a technique. Specifically, the patent to Ash et al. discloses an optical system in which individual connections are made involving the passage of light between a specific device in one array of optical devices and a specific device in another array of optical devices via a phase hologram plate of the transmission type fixed relative to each array.

U.S. Pat. No. 5,140,657 to Thylen discloses a device for optically coupling an optical fiber, forming part of an optical communication system, to an optical semiconductor laser amplifier. Specifically, the semiconductor laser amplifier has an input facet and an output facet, and the optical fiber has an end surface arranged opposite to at least one of the facets. A diffraction optics element is disposed between the end surface of the fiber and the surface of the facet in order to adapt the nearfield of the fiber end to the nearfield of the facet surface while filtering the same to reduce spontaneous emission noise. The diffraction optics element is described as being a phase hologram.

U.S. Pat. No. 6,072,579 to Funato discloses an optical pickup apparatus that includes first and second light sources that selectively emit one of first and second light beams. The first and second light beams are different in wavelength and are suitable for accessing first and second optical disks respectively. A coupling lens converts a corresponding one of the first and second light beams into a collimated beam. An objective lens forms a light spot on a corresponding one of the first and second optical disks by focusing the collimated beam. A holographic optical element receives a reflection beam of the light spot from one of the first and second optical disks and provides holographic effects on the reflection beam so as to diffract the reflection beam in predetermined diffracting directions depending on the wavelength of the reflection beam. A photo detector receives the reflection beam from the holographic optical element at light receiving areas and outputs signals indicative of respective intensities of the received reflection beam at the light receiving areas, so that a focusing error signal and a tracking error signal are generated based on the signals. A drawback with the aforementioned optical interconnect systems is that each coupling device requires precise alignment of the optical elements to achieve efficient coupling of optical energy.

What is needed, therefore, is an optical coupling technique that decreases the alignment tolerances of the various optical devices between which optical energy is coupled.

SUMMARY OF THE INVENTION

Provided is an optical communication system and method that features concurrently refracting and filtering, employing a holographic transform, optical energy to impinge upon an optical detector with unwanted characteristics of the optical energy being removed. To that end, the system includes a source of optical energy to direct optical energy along a path, an optical detector disposed in the path, and an optical apparatus. The optical apparatus has a spherical surface and a holographic transform function, with the optical apparatus being disposed to filter the optical energy in accordance with properties of the holographic transform function to remove optical energy having unwanted characteristics, defining transformed optical energy, and refract the transformed energy in accordance with properties of the spherical surface to impinge upon a detector.

In another embodiment, the system includes an array of optical transmitters to generate optical energy to propagate along a plurality of axes and an array of optical receivers, each of which is positioned to sense optical energy propagating along one of the plurality of optical axes. The optical apparatus includes first and second arrays of refractory lens. Each of the lens of the first array is disposed in one of the plurality of axes and has a first holographic transform function disposed thereon to filter from the optical energy unwanted characteristics. The first holographic transform function associated with a subgroup of the lens of the first array, defines a transfer function that differs from the first holographic transform function associated with the remaining lens of the first array of lenses. Each of the lenses of the second array is disposed between the first array of lenses and the array of optical receivers to collect optical energy propagating along the one of the plurality of optical axes. A subset of the lenses of the second array having a spherical surface with a second holographic transform function disposed on the second surface that matches the transfer function. A method is also disclosed, the functions of which are carried out by the aforementioned systems.

DETAILED DESCRIPTION OF THE INVENTION

Figure 1:
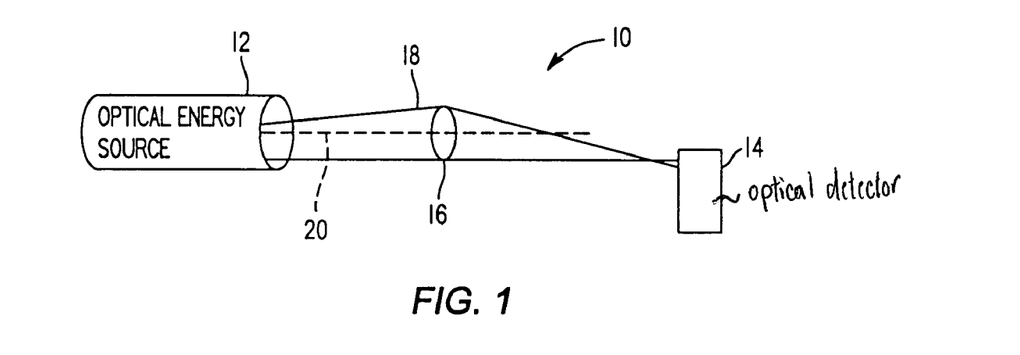
FIG. 1 is a simplified plan view of an optical communication system in accordance with the present invention.

Referring to FIG. 1, shown is an optical communication system 10 including a source of optical energy 12, an optical detector 14 in data communication with the source of optical energy 12, with an optical apparatus 16 disposed therebetween. The source 12 directs optical energy 18 along a path 20 in which the optical detector 14 lies. The optical apparatus 16 is disposed between the source 12 and the optical detector 14. Having both a refractory function and a holographic transform function, the optical apparatus 16 concurrently filters and refracts the optical energy propagating therethrough. In this manner, the optical apparatus 16 removes unwanted characteristics from the optical energy passing therethrough causing the same to impinging upon the optical detector 14.

The unwanted characteristics that may be removed from the optical energy 18 includes wavelength or polarization information. Specifically, the optical apparatus 16 is a refractory lens having a bulk hologram recorded therein that defines the transform function. The bulk hologram facilitates characterizing the optical energy 18 to have desired characteristics that may improve detection, by the optical detector 14, of information contained in the optical energy 18. For example, the transform function may allow a specific wavelength to pass through the lens, diffracting all other wavelengths to deflect away from the optical detector 14. Alternatively, the transform function may allow only a certain polarization of the optical energy 18 to propagate therethrough, diffracting all other polarizations away from the optical detector 14.

The refractory function of the optical apparatus 16 facilitates impingement of the optical energy 18 onto the optical detector 14. In this manner, the precise alignment of the optical detector 14 with respect to the source 12 and, therefore, the path 20 may be relaxed.

Figure 2:
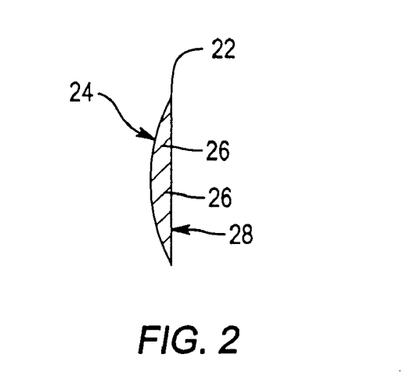
FIG. 2 is a cross-sectional view of a lens employed in the optical communication system shown above in FIG. 1, in accordance with the present invention.
Figure 3:
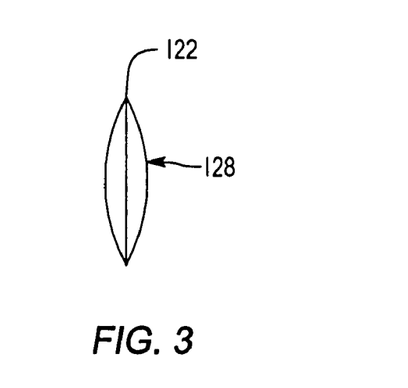
FIG. 3 is a cross-sectional view of the lens shown above in FIG. 2 in accordance with an alternate embodiment of the present invention.

Referring to FIG. 2, the optical apparatus 16 is a lens 22 having an arcuate surface 24, e.g., cylindrical, spherical and the like with a bulk holographic transform function formed therein. The bulk holographic transform function is shown graphically as periodic lines 26 for simplicity. The bulk holographic transform function 26 is recorded in substantially the entire volume of the lens 22 through which optical energy will propagate. The transform function 26 is a periodic arrangement of the space-charge field of the material from which the lens 22 is fabricated. To that end, the lens 22 may be formed from any suitable photo-responsive material, such as silver halide or other photopolymers. In this manner, the lens 22 and the bulk holographic transform function 26 is integrally formed in a manner described more fully below. Although the surface 28 of the lens 22 disposed opposite to the spherical arcuate surface 24 is shown as being planar, the surface 28 may also be arcuate as shown in surface 128 of lens 122 in FIG. 3.

Figure 4:
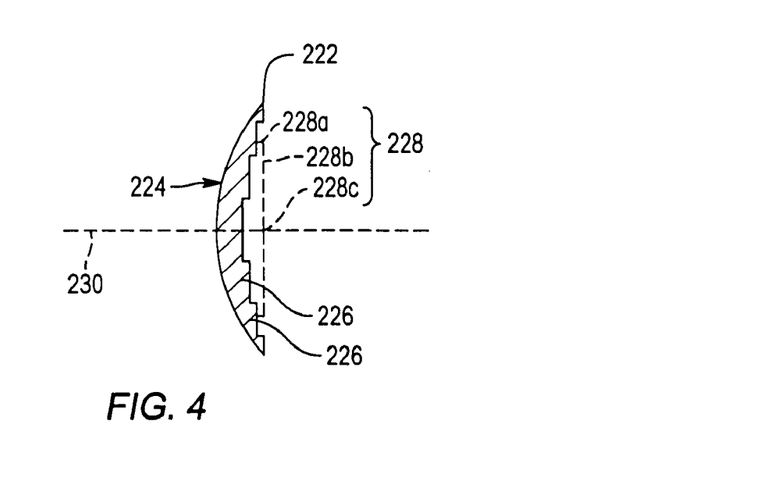
FIG. 4 is a cross-sectional view of the lens shown above in FIG. 2 in accordance with a second alternate embodiment of the present invention.

Referring to both FIGS. 2 and 4, were it desired to further control the shape of optical energy propagating through lens 22, a lens 222 may be formed with a fresnel lens 228 disposed opposite to the spherical surface 224. In this manner, substantially all of the optical energy propagating through the lens 222 may be focused to differing points, depending upon the wavelength of optical energy propagating therethrough. To that end, the fresnel lens 228 includes a plurality of concentric grooves, shown as recesses 228a 228b and 228c that are radially symmetrically disposed about a common axis 230. Thus, the lens 222 may have three optical functions integrally formed in a common element, when providing the bulk holographic transform function 226 therein.

Figure 5:
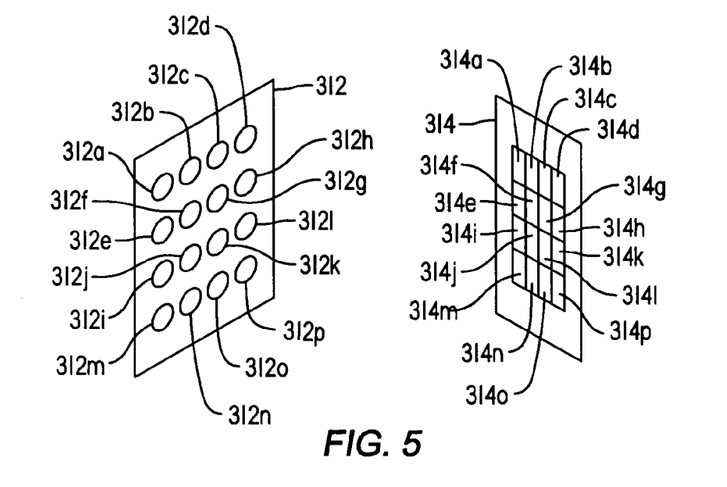
FIG. 5 is perspective view of the optical communication system shown above in FIG. 1, in accordance with an alternate embodiment.

Referring to FIG. 5 in another embodiment, the optical communication system 310 includes an array 312 of optical transmitters, shown generally as 312a–312p and an array 314 of optical detectors, shown generally as 314a–412p. The optical transmitters 312a–312p generate optical energy to propagate along a plurality of axes, and the optical receivers 314a–314p are positioned to sense optical energy propagating along one of the plurality of optical axes. Specifically, the array 312 is an (X×Y) array of semiconductor lasers that produce a beam that may be modulated to contain information. The array 314 may comprise of virtually any optical detector known, such a charged coupled devices (CCD) or charge injection detectors (CID). In the present example, the array 314 comprises of CIDs arranged in an (M×N) array of discrete elements. The optical beam from the each of the individual emitters 312a–312p may expand to impinge upon each of the detectors 314a–412p of the array 314 if desired. Alternatively, the optical beam from each of the individual emitters 312a–312p may be focused to impinge upon any subportion of the detectors 314a–314p of the array 314. In this fashion, a beam sensed by one of the detectors 314a–314p of the array 314 may differ from the beam sensed upon the remaining detectors 314a–314p of the array 314. To control the wavefront of the optical energy produced by the transmitters 312a–312p, the optical apparatus 16, discussed above with respect to FIGS. 1–4 may be employed as an array of the lenses 22, shown more clearly in FIG. 6 as array 400.

Figure 7:
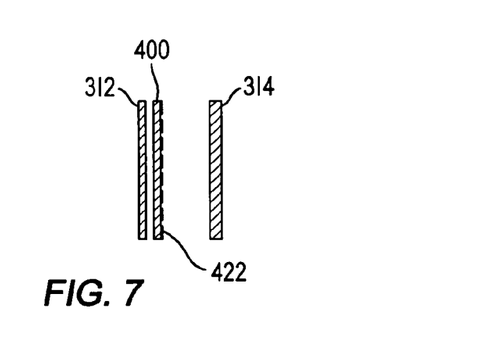
FIG. 7 is a cross-sectional plan view of the optical communication system shown above in FIG. 5, in accordance with the present invention.

Specifically, referring to FIGS. 5 and 7, the individual lenses 422 of the array are arranged to be at the same pitch and sizing of the array 312. The numerical aperture of each of the lenses 422 of the array 400 is of sufficient size to collect substantially all of the optical energy produced by the transmitters 312a–312p corresponding thereto. In one example, the array 400 is attached to the array 312 with each lens resting adjacent to one of the transmitters 312a–312p. To provide the necessary functions, each of the lenses of the array 400 may be fabricated to include the features mentioned above in FIGS. 2–4. As a result, each of the lenses 422 of the array may be formed to having functional characteristics that differ from the remaining lenses 422 of the array. In this manner, each beam produced by the array 312 may be provided with a unique wavelength, polarization or both. This facilitates reducing cross-talk and improving signal-to-noise ratio in the optical communication system 310.

Figure 6:
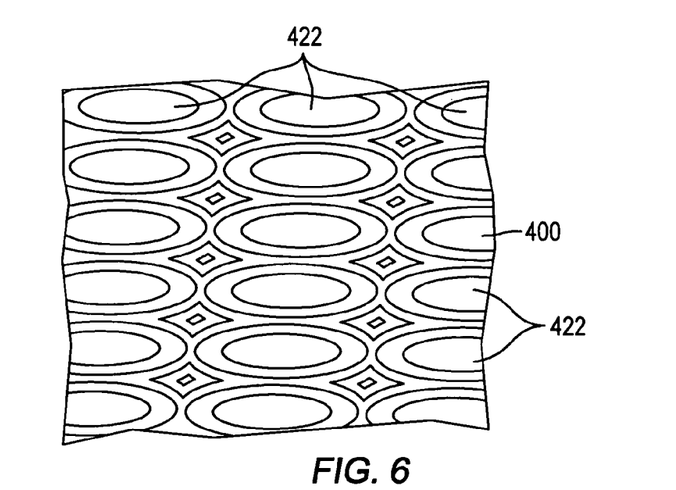
FIG. 6 is perspective view of an array of the lenses fabricated on a photo-sheet shown above in FIG. 5.
Figure 8:
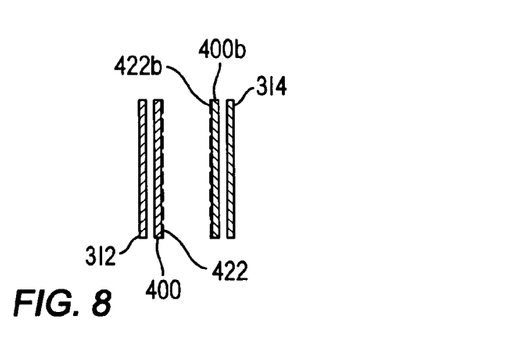
FIG. 8 is a cross-sectional plan view of the optical communication system shown above in FIG. 7, in accordance with an alternate embodiment of the present invention.

Specifically, the optical apparatus 316 may include an additional array of lenses 400b that match the pitch of the individual detectors 314a–314p of the array 314, shown more clearly in FIG. 8. The lens may be fabricated to provide the same features as discussed above with respect to array 400, shown in FIG. 6. Referring to FIGS. 5, 6 and 8 each of the transmitters 312a–312p of the array 312 would then be uniquely associated to communicate with only one of the detectors 314a–314p of the array 314. In this manner, the transmitter 312a–312p of the array 312 that is in data communication with one of the one of the detectors 314a–314p of the array 314 would differ from the transmitters 312a–312p in data communication with remaining detectors 314a–314p of the array 314. This transmitter detector pair that were in optical communication is achieved by having the properties of the lens 422 in array 400 match the properties of the lens 422b in array 400b. It should be understood, however that one of the transmitters 312a–312p may be in data communication with any number of the detectors 314a–314p by multiple lenses 422b matching the properties of one of the lenses 422. Similarly, one of the multiple transmitters 312a–312p may be in optical communication with one or more of the detectors 314a–314p by appropriately matching the lenses 422 to the lenses 422b.

In one example, superior performance was found by having the array 314 sectioned into (m×n) bins, with each bin corresponding to a particular polarization and/or wavelength that matched a particular polarization and/or wavelength corresponding to a transmitter 312a–312p. Thus, were a beam from one or more of the transmitters 312a–312p to flood the entire (M×N) array 314 or multiple (m×n) bins, only the appropriate detectors 314a–314p sense information with a very high signal-to-noise ratio and discrimination capability. It will be noted that the (m×n) bins can also be effectively comprised of a single sensing pixel (element) to exactly match the (X×Y) array.

Additional beam-sensor discrimination may be achieved by employing transmitters 312a–312p having different wavelengths or by incorporating up-conversion processes that include optical coatings applied to the individual transmitters 312a–312p or made integral therewith. One such up-conversion process is described by F. E. Auzel in "Materials and Devices Using Double-Pumped Phosphors With Energy Transfer", Proc. of IEEE, vol. 61. no. 6, June 1973.

Figure 9:
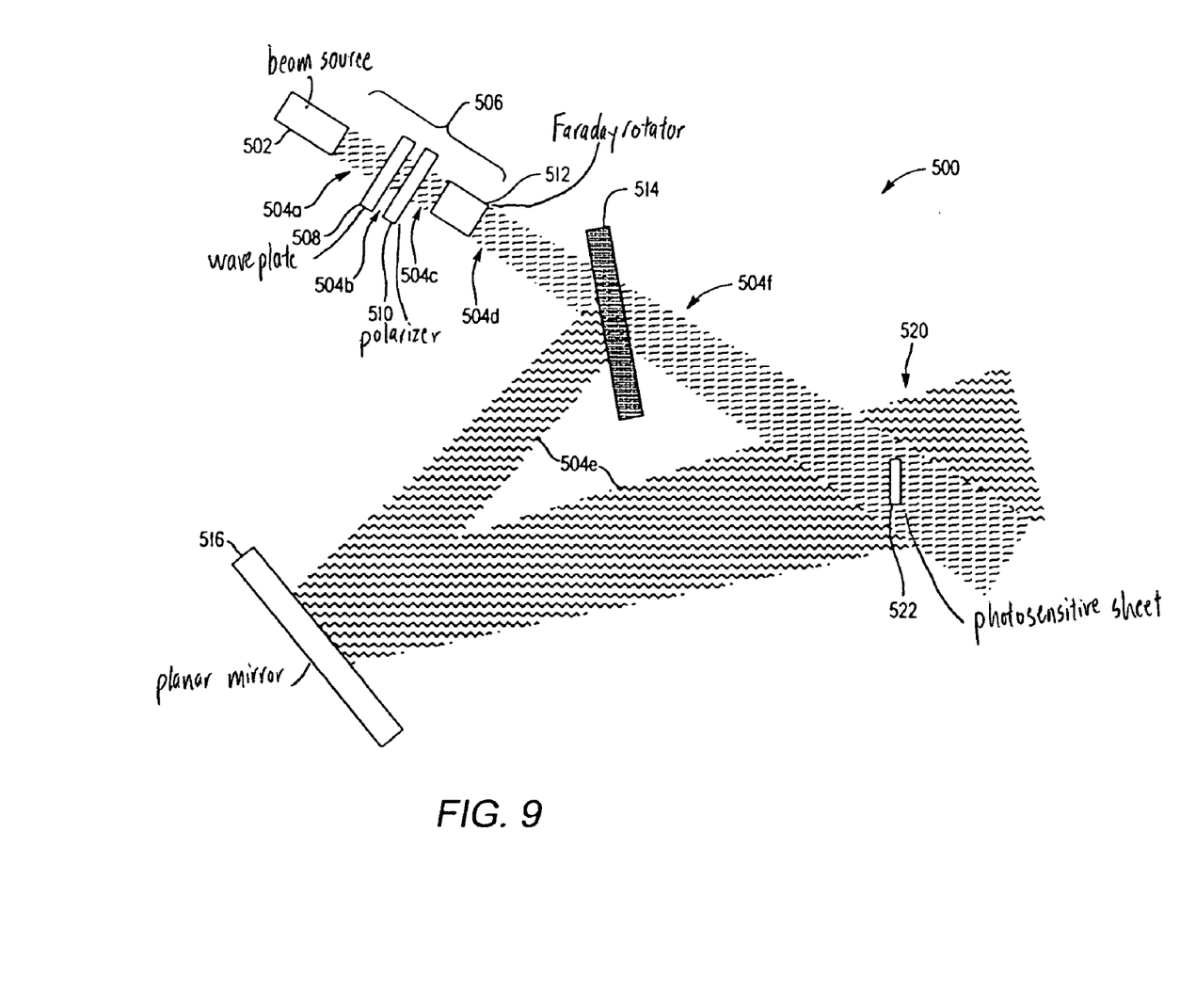
FIG. 9 is a simplified plan view showing an apparatus for fabricating the lenses shown above in FIGS. 2–4 and 6, in accordance with the present invention.

Referring to FIGS. 2, 8 and 9, the system 500 employed to fabricate the lens 22 and the lens arrays 400 and 400b includes a beam source 502 that directs a beam 504a into wave manipulation optics 506 such as a ¼ waveplate 508 so that the beam 504b is circularly polarized. The beam 504b impinges upon polarizer 510 so that the beam 504c propagating therethrough is linearly polarized. The beam 504c impinges upon a Faraday rotator 512 that changes birefringence properties to selectively filter unwanted polarizations from the beam 504c. In this manner, the beam 504d egressing from the rotator 512 is linearly polarized. The beam 504d impinges upon a beam splitter 514 that directs a first subportion 504e of beam 504d onto a planar mirror 516. A second subportion 504f of the beam 504d pass through the splitter 514. The first and second subportions 504e and 504f intersect at region 520 forming an optical interference pattern that is unique in both time and space. A photosensitive sheet 522 is disposed in the region so as to be exposed to the optical interference pattern. The interference pattern permeates the photosensitive sheet 522 and modulates the refractive index and charge distribution throughout the volume thereof. The modulation that is induced throughout the volume of the photosensitive sheet 522 is in strict accordance with the modulation properties of the first and second subportions 504e and 504f. Depending upon the photosensitive material employed, the holographic transform function may be set via thermal baking.

Figure 10:
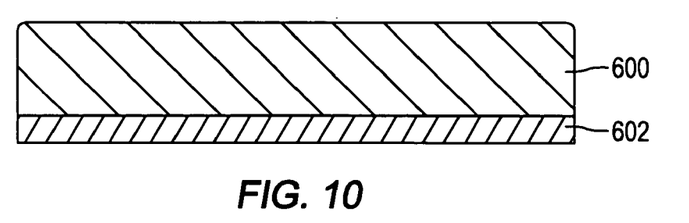
FIG. 10 is a cross-sectional view of a substrate on which the lenses discussed above with respect to FIGS. 2–4 and 6 are fabricated.
Figure 11:
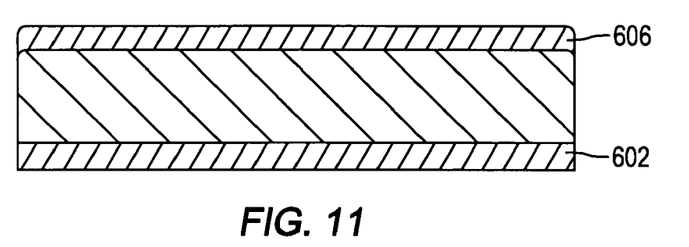
FIG. 11 is a cross-sectional view of the substrate, shown above in FIG. 10, under going processing showing a photoresist layer disposed thereon.

Referring to FIGS. 9 and 10, an arcuate surface is formed in the photosensitive sheet 522 by adhering a photosensitive layer 600 to a sacrificial support 602, such as glass, plastic and the like to form a photosensitive substrate 604. Typically, the photosensitive layer 600 is tens of microns thick. As shown in FIG. 11, a photo resist layer 606 is deposited onto the photosensitive layer 600 and then is patterned to leave predetermined areas exposed, shown as 608 in FIG. 12, defining a patterned substrate 610. Located between the exposed areas 608 are photo resist islands 612. The patterned substrate 610 is exposed to a light source, such as ultraviolet light. This ultraviolet light darkens the volume of the photo resist layer 600 that is coextensive with the exposed areas 608 being darkened, i.e., become opaque to optical energy. The volume of the photosensitive layer 600 that are coextensive with the photo resist islands 612 are not darkened by the ultraviolet light, i.e., remaining transparent to optical energy. Thereafter, the photo resist islands 612 are removed using standard etch techniques, leaving etched substrate 614, shown in FIG. 13.

Figure 12:
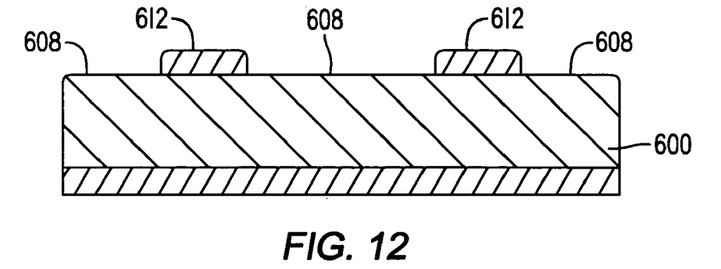
FIG. 12 is a cross-sectional view of the substrate, shown above in FIG. 11, under going processing showing a photoresist layer being patterned.
Figure 13:
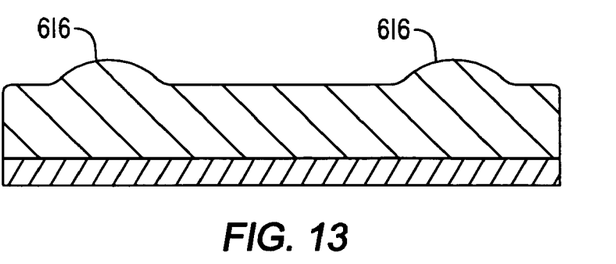
FIG. 13 is a cross-sectional view of the substrate, shown above in FIG. 12, under going processing after a first etch step.

The etched substrate 614 has two arcuate regions 616 that are located in areas of the photosensitive layer 600 disposed adjacent to the islands 612, shown in FIG. 12. The arcuate regions 616 of FIG. 13 result from the difference in exposure time to the etch process of the differing regions of the photosensitive layer 600.

Figure 14:
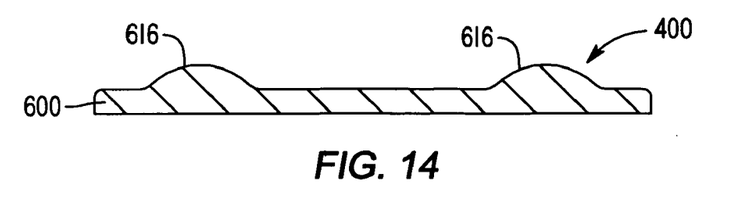
FIG. 14 is a cross-sectional view of the substrate, shown above in FIG. 13, under going processing after a second etch step.

Referring to FIGS. 8 and 14, a subsequent etch process is performed to form array 400. During this etch process the support is removed as well as nearly 50% of the photosensitive layer 600 to form a very thin array. The array 400 is then placed in the apparatus 500 and the bulk holographic transform functions are recorded in the arcuate regions 616 that define the lenses 422, as discussed above. A fresnel lens may also be formed on the lenses 422 of the array using conventional semiconductor techniques. Thereafter, the lenses may be segmented from the photo resistive sheet or M×N subarrays of lenses may be segmented therefrom.

Although the invention has been described in terms of specific embodiments, one skilled in the art will recognize that various changes to the invention may be performed, and are meant to be included herein. For example, instead of forming the arcuate regions 616 using standard etch techniques, the same may be formed by exposing the substrate 610, shown in FIG. 12, to thermal energy. In one example, the substrate 610 is convectionally heated, and the photo resist layer 606 is patterned to control the regions of the photosensitive layer 600 that may expand. In another example, the photosensitive layer is heated by conduction employing laser ablation/shaping. Specifically, a laser beam impinges upon areas of the photosensitive layer 600 where lens are to be formed. The thermal energy from the laser beam causes the photosensitive layer 600 to bubble, forming arcuate regions 616 thereon shown in FIG. 13. Therefore, the scope of the invention should not be based upon the foregoing description. Rather, the scope of the invention should be determined based upon the claims recited herein, including the full scope of equivalents thereof.

What is claimed is:

1. An optical communication system comprising:
    a source of optical energy to propagate optical energy along an optical path;
    a detector positioned in the optical path; and
    an optical system having an arcuate surface and a holographic transform function disposed within a volume of the optical system, with the optical system being disposed to filter the optical energy in accordance with properties of the holographic transform function to remove optical energy having unwanted characteristics, defining transformed optical energy, and refract the transformed energy in accordance with properties of the arcuate surface to impinge upon the detector.

2. The system as recited in claim 1 wherein the characteristics are selected from a group consisting essentially of polarization, wavelength and phase.

3. The system as recited in claim 1 wherein the source of optical energy includes an array of optical transmitters to generate optical energy to propagate along a plurality of axes and the detector includes an array of optical receivers, each of which is positioned to sense optical energy propagating along one of the plurality of optical axes and the optical system includes an array of lenses, each of which is disposed in one of the plurality of axes and includes the arcuate surface with the holographic transform being disposed within a volume of the array of lenses.

4. The system as recited in claim 1 wherein the source of optical energy includes an array of optical transmitters to generate optical energy to propagate along a plurality of axes and the detector includes an array of optical receivers, each of which is positioned to sense optical energy propagating along one of the plurality of optical axes and the optical system including a plurality of lenses having the arcuate surface with holographic transform function being disposed within a volume thereof, with the plurality of lenses being arranged in first and second arrays, the first array being disposed between the array of optical transmitters and the array of optical receivers and the second array being disposed between the first array and the optical receivers.

5. The system as recited in claim 4 wherein the holographic transform function associated with a subgroup of the lenses of the first array, defining a transfer function, differs from the holographic transform function associated with the remaining lenses of the first array of lenses, and the holographic transform function associated with a subset of the lenses of the second array matches the transfer function.

6. The optical communication system as recited in claim 1 wherein the optical system has opposed sides with a spherical surface being positioned on one of the opposed sides and a planar surface being disposed on the remaining side of the opposed sides.

7. The optical communication system as recited in claim 1 wherein the optical system has opposed sides with a cylindrical surface being positioned on one of the opposed sides and a planar surface being disposed on the remaining side of the opposed sides.

8. The optical communication system as recited in claim 1 wherein the optical system has opposed sides with a spherical surface being positioned on one of the opposed sides and a rotary symmetric arrangement of grooves defining a fresnel lens being disposed on the remaining side of the opposed sides.

9. The optical communication system as recited in claim 1 wherein the optical system has opposed sides with a cylindrical surface being positioned on one of the opposed sides and a rotary symmetric arrangement of grooves defining a fresnel lens being disposed on the remaining side of the opposed sides.

10. The optical communication system as recited in claim 1 wherein the optical system has opposed sides, both of which are arcuate.

11. An optical communication system comprising:
    an array of optical transmitters to generate optical energy to propagate along a plurality of axes;
    an array of optical receivers, each of which is positioned to sense optical energy propagating along one of the plurality of optical axes;
    a first array of refractory lenses, each of which is disposed in one of the plurality of axes and has a first holographic transform function disposed therein to filter from the optical energy unwanted characteristics, with the first holographic transform function associated with a subgroup of the lens of the first array, defining a transfer function, differing from the first holographic transform function associated with the remaining lens of the first array of lenses, with the first holographic transform function disposed within a volume of each of the lenses of the first array; and
    a second array of refractory lenses, each of which is disposed between the first array of lenses and the array of optical receivers to collect optical energy propagating along the one of the plurality of optical axes, with a subset of the lenses of the second array having a second holographic transform function disposed therein that matches the transfer function, with the second holographic transform function disposed throughout a volume of each of the lenses of the second array.

12. The optical communication system as recited in claim 11 wherein the lenses of the first and second array include a rotary symmetric arrangement of grooves defining a fresnel lens.

13. The optical communication system as recited in claim 11 wherein the lenses of the first and second arrays have a spherical surface and an additional surface disposed opposite to the spherical surface, with a fresnel lens being disposed on the additional surface.

14. The optical communication system as recited in claim 11 wherein the lenses of the first and second arrays have a cylindrical surface and an additional surface disposed opposite to the cylindrical surface, with a fresnel lens being disposed on the additional surface.

15. The system as recited in claim 11 wherein the characteristics are selected from the group consisting essentially of polarization, wavelength and phase.

16. A communication system comprising:
    a source of energy to propagate energy along a path;
    a detector positioned in the path; and
    a filtering element having a volume with a holographic transform function recorded in the volume, with the filtering element being disposed to filter the energy in accordance with properties of the holographic transform function to remove energy having unwanted characteristics, defining transformed energy, and impinge the transformed energy in accordance with properties of the arcuate surface upon the detector, wherein the filtering element has opposed sides, both of which are arcuate.

17. The system as recited in claim 16 wherein the characteristics are selected from a group consisting essentially of polarization, wavelength and phase.

18. The system as recited in claim 16 wherein the source of energy includes an array of optical transmitters to generate optical energy to propagate along a plurality of axes and the detector includes an array of optical receivers, each of which is positioned to sense optical energy propagating along one of the plurality of optical axes and the optical system includes an array of lenses, each of which is disposed in one of the plurality of axes.

19. The system as recited in claim 16 wherein the source of energy includes an array of optical transmitters to generate optical energy to propagate along a plurality of axes and the detector includes an array of optical receivers, each of which is positioned to sense optical energy propagating along one of the plurality of optical axes and the optical system including a plurality of lenses arranged in first and second arrays, the first array being disposed between the array of optical transmitters and the array of optical receivers and the second array being disposed between the first array and the optical receivers.

20. The system as recited in claim 16 wherein the communication system is an optical communalization system, the energy is an optical energy, the path is an optical path, the detector is an optical detector, and the filtering element is an optical filtering element.

* * * * *